United States Patent [19]
Campagnolo

[11] Patent Number: 6,142,281
[45] Date of Patent: Nov. 7, 2000

[54] SPEED CHANGE CONTROL UNIT FOR A BICYCLE PROVIDED WITH A TRANSDUCER DEVICE AND TRANSDUCER DEVICE USED IN THIS UNIT

[75] Inventor: Valentino Campagnolo, Vicenza, Italy

[73] Assignee: Campagnolo S.r.l., Vicenza, Italy

[21] Appl. No.: 09/262,062

[22] Filed: Mar. 4, 1999

[30] Foreign Application Priority Data

Jun. 5, 1998 [IT] Italy .................................. TO98A0492

[51] Int. Cl.[7] .................................................. B60K 41/26
[52] U.S. Cl. ........................................ 192/217; 74/473.14
[58] Field of Search ........................... 74/473.15, 473.14; 192/217; 16/28.1; 340/456

[56] References Cited

U.S. PATENT DOCUMENTS

| | | | |
|---|---|---|---|
| 4,100,820 | 7/1978 | Evett | 192/217 X |
| 4,859,984 | 8/1989 | Romano | 340/456 X |
| 4,912,997 | 4/1990 | Malcolm et al. | 74/473.12 X |
| 5,257,683 | 11/1993 | Romano | 192/217 |
| 5,479,776 | 1/1996 | Romano | 192/217 X |
| 5,621,382 | 4/1997 | Yamamoto | 116/28.1 X |
| 5,676,021 | 10/1997 | Campagnolo | 74/473.13 X |
| 5,903,214 | 5/1999 | Watarai | 340/456 X |
| 5,921,138 | 7/1999 | Kojima et al. | 74/473.13 |
| 5,949,344 | 9/1999 | Yasuda et al. | 340/456 X |

*Primary Examiner*—Rodney H. Bonck
*Attorney, Agent, or Firm*—Sughrue, Mion, Zinn, Macpeak & Seas, PLLC

[57] ABSTRACT

A bicycle speed change control unit is provided with a transducer device adapted to send an electric signal indicative of the transmission ratio selected by the speed change device. The transducer device comprises an auxiliary supporting body which also carries a control button for selecting the mode of operation of the on-board electronic control unit of the bicycle.

7 Claims, 3 Drawing Sheets

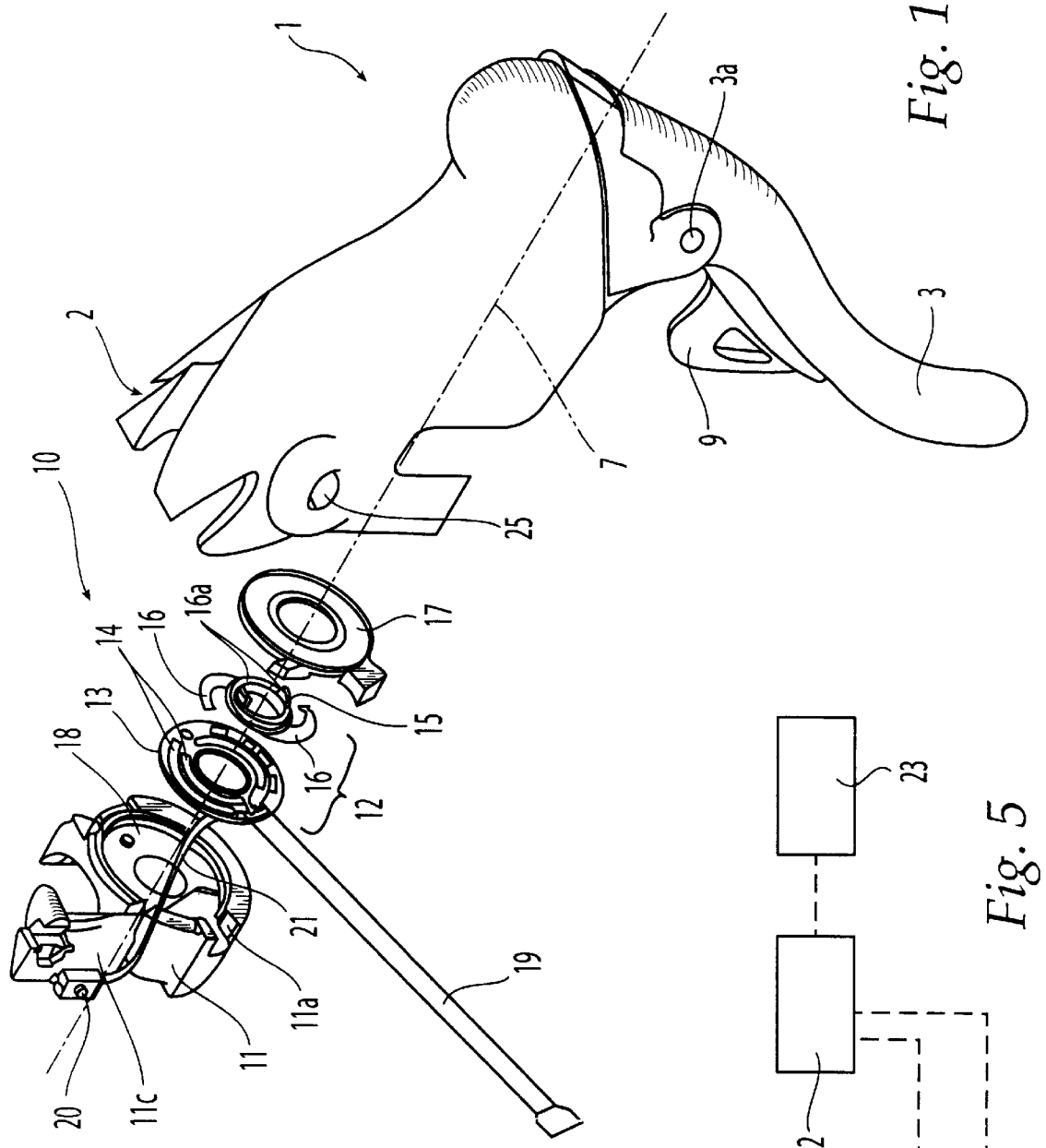
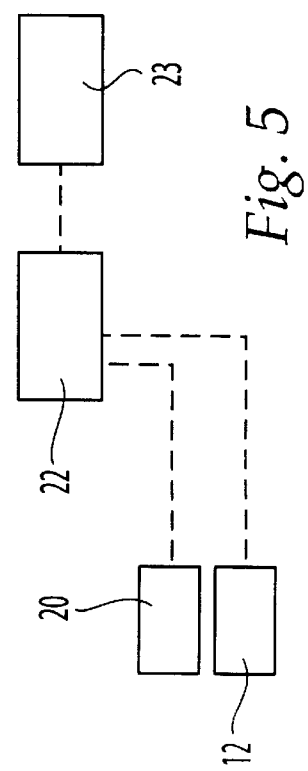

SPEED CHANGE CONTROL UNIT FOR A BICYCLE PROVIDED WITH A TRANSDUCER DEVICE AND TRANSDUCER DEVICE USED IN THIS UNIT

BACKGROUND OF THE INVENTION

The present invention relates to speed change control units for bicycles.

In particular, the invention relates to a speed change control unit of the type comprising a rotor, carrying a pulley for winding a change control cable, said rotor being rotatably mounted within a body supporting a bicycle brake lever and being provided with indexing means defining the operative positions of the rotor corresponding to the various transmission ratios which can be selected by the speed change device, said unit further comprising two rotor driving levers located at positions which can be easily reached by the fingers of the hand of the cyclist without substantially modifying the position of the hand on the bicycle handlebar, said levers being adapted to cause rotation of the rotor in the two opposite directions respectively, with the aid of associated ratchet-like means. A unit of this type has been manufactured and marketed by the Applicant for many years under the trademark "ERGOPOWER" and has formed the subject of U.S. Pat. No. 5,479,776, as well as parallel German patent No. 44 13 610 and French patent No. 2.704.199.

In recent years, the use has become more and more popular in bicycles of on-board computers with an associated display for enabling the cyclist to display various operative parameters, including also the transmission ratio which is selected by means of the speed change device. Therefore, it has become necessary to provide transducer devices able to send electrical signals indicative of the operative conditions of the speed change device to an electronic control unit.

SUMMARY OF THE INVENTION

The object of the present invention is that of providing a transducer device which is particularly adapted to be used in a speed change control unit of the type indicated at the beginning of the present description, and which is simple and efficient.

In view of achieving this object, the invention provides a speed change control unit of the above indicated type, characterized in that it is provided with a transducer device able to transmit an electric signal indicative of the operative position of said rotor, said transducer device being mounted within an auxiliary supporting body which is provided with means for being secured to said body supporting the brake lever, said auxiliary supporting body also supporting a button, at a position which is easily reachable for the fingers of the cyclist hand, which button is to be connected electrically to an electronic control unit of the bicycle, and being for example for selecting a mode of operation of said electronic control unit or a displaying mode on an on-board display which is connected to said electronic control unit.

Said transducer device is preferably an absolute type position sensor, comprising a potentiometer having a rotating element rotatably mounted within the auxiliary supporting body. It is made in such a way that it can be associated to the above described unit with no particular complications on construction and has the further advantage of incorporating the button for controlling the mode of operation of the control unit, which is usually provided as a separate element usually associated directly to the on-board display. Due to these features, the cyclist is able to handle the bicycle, to brake, to control the speed change, as well as to operate the button for controlling the bicycle computer functions, without substantially modifying the position of the hands on the handlebar.

BRIEF DESCRIPTION OF THE DRAWINGS

Further features and advantages of the invention will become apparent from the following description with reference to the annexed drawings, given purely by way of non limiting example, in which:

FIG. 1 is a perspective exploded view of a brake and speed change control unit, for a race bicycle, provided with a transducer device, FIG. 5 is a block diagram which shows the application of the device according to the invention in a bicycle.

DETAILED DESCRIPTION OF THE INVENTION

Figure 3:
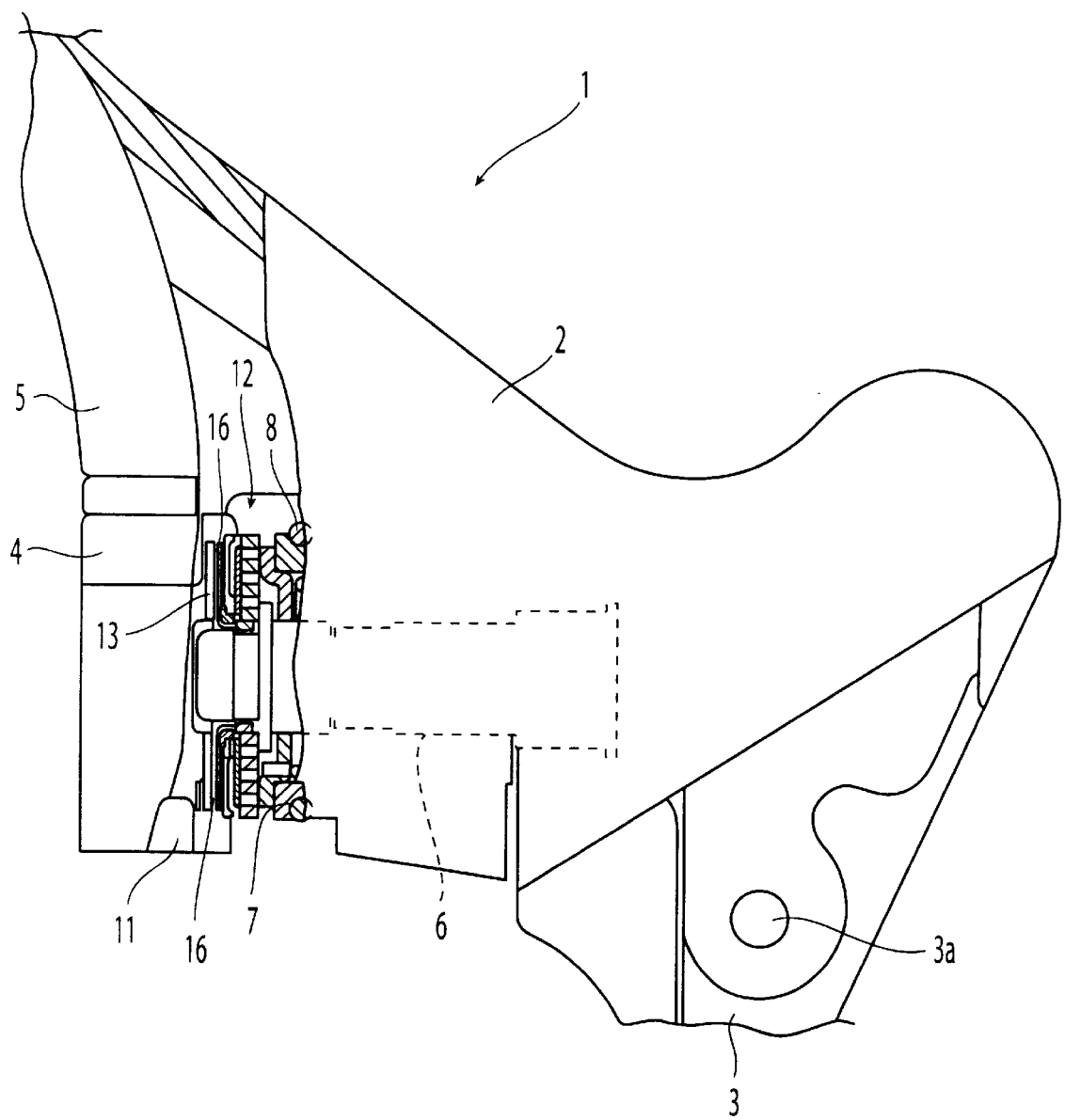
FIG. 3 is a view at an enlarged scale of a detail of FIG. 2, partially in cross-section.

In the drawings, numeral 1 generally designates a speed change and brake control unit for race bicycles, of the type marketed by the Applicant under the trademark "ERGOPOWER" and shown in the above identified prior patents. For this reason, the details of construction of this unit will not be described herein, since they are known per se. The unit 1 comprises a supporting body 2, such as of plastic material, to which a brake lever 3 is articulated at 3a. The body 2 is provided with a clamp 4 for being secured to a portion 5 of the handlebar of the race bicycle (see FIG. 3). Within the body 2 there is rotatably mounted a rotor 6 having an axis 7 directed parallel to the longitudinal direction of the bicycle. The rotor 6 carries a pulley 7 (FIG. 3) for winding a cable 8 driving a derailleur of the bicycle. Furthermore, with the rotor 6 there are associated indexing means (not shown herein) able to define a plurality of stable positions of the rotor 6 corresponding to the various transmission ratios which can be selected by means of the speed change device. With the rotor 6 there are further associated two levers 9, only one of which is visible in the drawings at a position immediately behind the brake lever 3, the other lever being arranged substantially horizontally and projecting from side of body 2. The levers 9 are used for controlling the rotation of the rotor 6 in the two opposite directions respectively. The levers 9 drive the rotor with the aid of respective pawl-like mechanisms (not shown herein) by which each lever is able to cause a rotation of the rotor from one stable position to another stable position, the lever itself being returned elastically, upon each actuation, to its starting position, where it can be easily reached by the fingers of the hand of the cyclist which holds the handlebar. As already indicated above, all the above mentioned detail of construction are not shown herein, since they are known and fully described in the prior patents which have been identified above.

According to the invention, with the above described unit there is associated a transducer device 10, comprising an auxiliary supporting body 11 carrying an absolute position sensor constituted by a potentiometer 12. The potentiometer 12 includes a disk 13 secured to the auxiliary supporting body 11 and bearing a plurality of conductive paths 14 and a rotating element 15, carrying sliding contacts 16, which is connected in rotation with rotor 6, the whole of said elements being held by a further disk 17 secured within a seat 18 of the auxiliary supporting body 11. Reference numeral 19 designates a flat wire band which is connected to the contacts of the potentiometer and projects out of the body 11 through a slot 11a. In the illustrated example, the rotating element 15 is connected in rotation with rotor 6 by means of two front teeth 16a.

Figure 2:
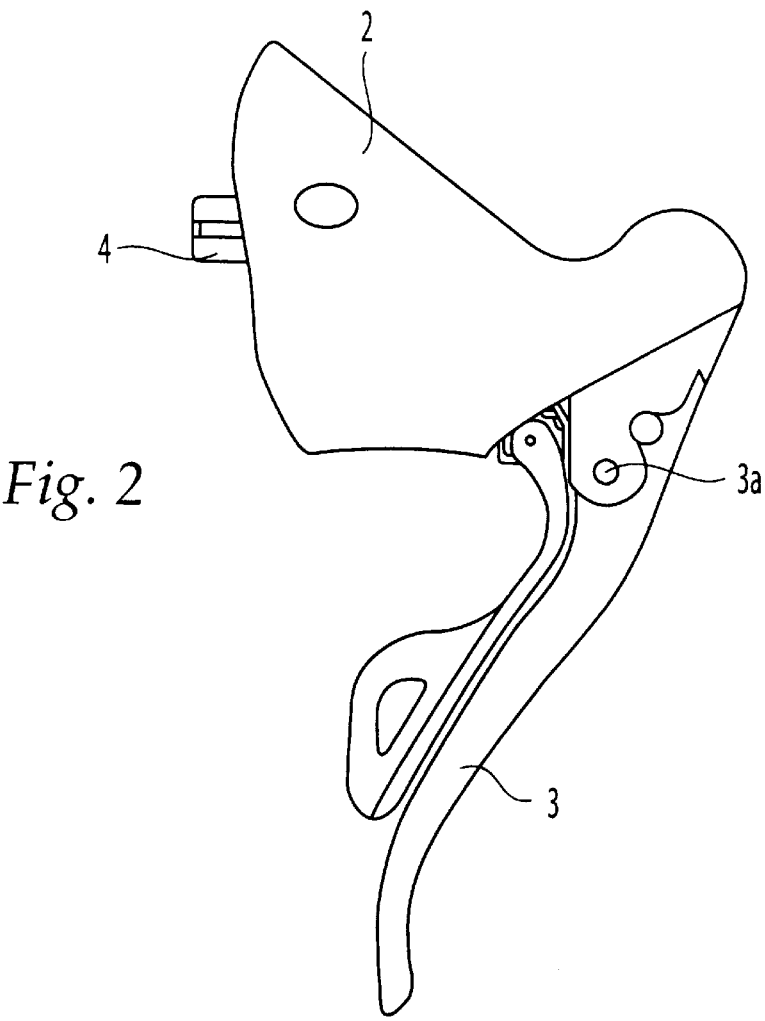
FIG. 2 is a diagrammatic side view of the unit of FIG. 1.
Figure 4:
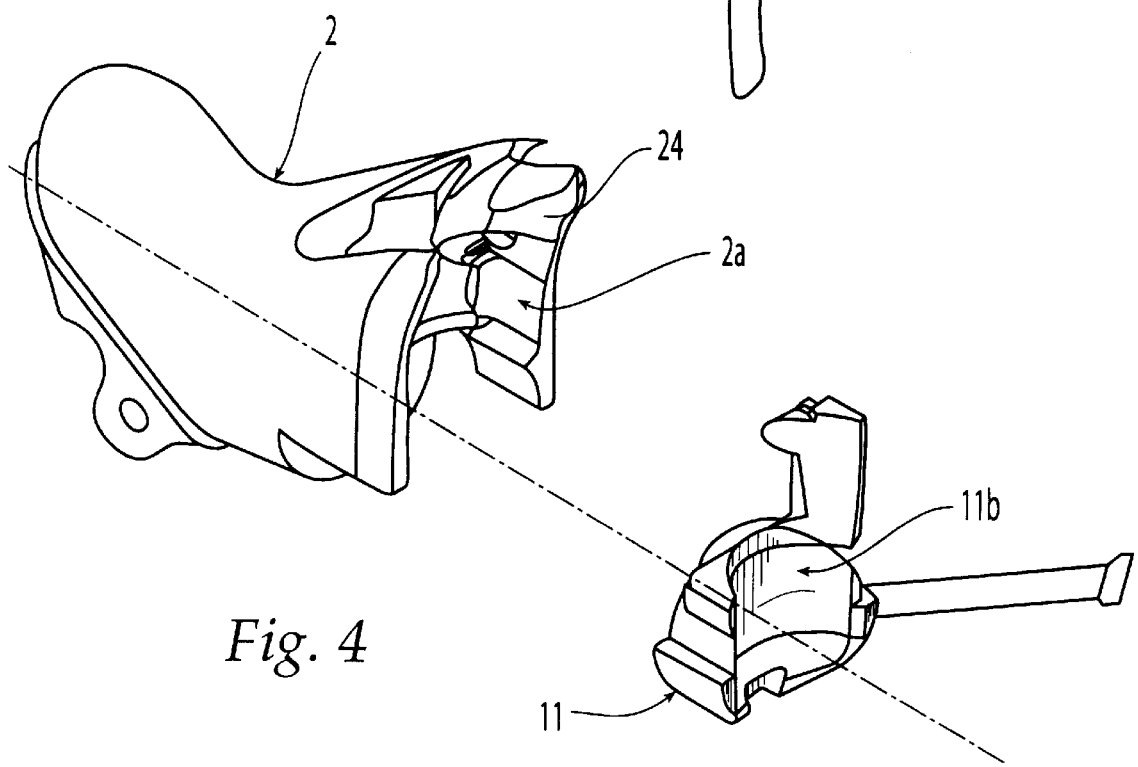
FIG. 4 is a perspective exploded view of a detail of the device of FIG. 1, viewed from the side opposite to that of FIG. 1.

As shown in FIG. 4, the supporting body 11 with the potentiometer mounted thereon is received within a rear seat 2a of the body 2 by shape mating engagement. The opposite face of the supporting body 11b with complementary to the outer surface of the handlebar portion 5 on which the support 2 is secured, so that the auxiliary supporting body 11b is pressed between the main supporting body 2 and the surface of the handlebar 5.

According an important feature of the invention, the auxiliary supporting body 11 has an arm 11c projecting upwardly which bears at its upper end a button 20 connected by wires 21 to the flat wire band 19. The button 20 is to be connected to the electronic control unit 22 (FIG. 5) with which the bicycle is provided in order to allow the mode of operation of the control unit 22 or the displaying mode on a display 23 associated with the control unit 22 to be selected.

Also arm 11c carrying the button 20 has a shape complementary to that of a portion 24 of the seat 2a formed in the main supporting body 2.

In the mounted condition, the button 20 is in front of a portion 25 constituted by a flexible diaphragm, having a thin wall, protecting the button 20 and forming a pressure area for actuating the button itself.

As clearly apparent from the foregoing description, due to the invention, a speed change control unit of the type described can be provided with a transducer device which is at the same time simple and efficient, while incorporating the button 20 for controlling the bicycle computer functions within the same device.

Naturally, while the principle of the invention remains the same, the details of construction and the embodiments may widely vary with respect to what has been described and illustrated purely by way of example.

For example, the auxiliary body 11 can be made by a number of elements connected to each other and having a single electric wire assembly coming out of it.

What is claimed is:

1. Speed change control unit for a bicycle, comprising a rotor, carrying a pulley for winding a cable driving the speed change device, said rotor being rotatably mounted within a body supporting a brake lever of the bicycle and being provided with indexing means defining the operative positions of the rotor corresponding to the various transmission ratios which can be selected with the aid of the speed change device, said unit further comprising two rotor driving levers located at positions which can be easily reached by the fingers of the hand of the cyclist without substantially modifying the position of the hand on the bicycle handlebar, said levers being adapted to cause rotation of the rotor in the two opposite directions respectively, with the aid of respective ratchet means associated with said rotor, wherein with said speed change control unit there is associated a transducer device adapted to transmit an electric signal indicative of the operative position of the rotor, said transducer device being mounted within an auxiliary supporting body which is provided with means for securing to said body supporting the brake lever, said auxiliary supporting body carrying also a button at a position which can be easily reached by the fingers of the hand of the cyclist, which button is to be electrically connected to an electronic unit of the bicycle, to enable a mode of operation of said control unit or a displaying mode on an on-board display connected to said electronic control unit to be selected.

2. Speed change control unit according to claim 1, wherein said rotor has its axis arranged parallel to the longitudinal direction of the bicycle, and said auxiliary supporting body is received by the engagement of mating complementary surfaces within a seat of said brake lever supporting body, said auxiliary supporting body being interposed between said main supporting body and the bicycle handlebar.

3. Speed change control unit according to claim 2, wherein said auxiliary supporting body has a substantially cylindrical shape with a projecting arm carrying said control button.

4. Speed change control unit according to claim 3, wherein said transducer device is an absolute position sensor and comprises a potentiometer which has a disk secured within said auxiliary supporting body and bearing a plurality of conductive paths cooperating with sliding contacts carried by a rotating element, said rotating element being provided with means for coupling in rotation with said rotor.

5. Speed change control unit according to claim 4, wherein in the mounted condition of the auxiliary supporting body within said brake lever supporting body, said control button is covered by a portion of said supporting body which is constituted by a thin wall diaphragm.

6. Transducer device for a bicycle, wherein the transducer device is adapted to be mounted on a speed change control unit as set forth in claim 1.

7. Speed change control unit according to claim 2, wherein said auxiliary body is constituted by a number of elements connected to each other, with a single wire assembly coming out of the auxiliary body.

* * * * *